US008818099B2

(12) United States Patent
Tian

(10) Patent No.: US 8,818,099 B2
(45) Date of Patent: Aug. 26, 2014

(54) DOCUMENT IMAGE BINARIZATION AND SEGMENTATION USING IMAGE PHASE CONGRUENCY

(75) Inventor: Yibin Tian, Menlo Park, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 175 days.

(21) Appl. No.: 13/607,667

(22) Filed: Sep. 8, 2012

(65) Prior Publication Data

US 2014/0072219 A1    Mar. 13, 2014

(51) Int. Cl.
*G06K 9/34* (2006.01)
(52) U.S. Cl.
USPC .......................................................... 382/176
(58) Field of Classification Search
None
See application file for complete search history.

(56) References Cited

U.S. PATENT DOCUMENTS

2005/0213841 A1* 9/2005 Linguraru et al. ............ 382/261
2007/0189580 A1* 8/2007 Slabaugh et al. ............. 382/103
2008/0253622 A1* 10/2008 Tosa et al. ..................... 382/117
2013/0070990 A1* 3/2013 Martel et al. .................. 382/131
2013/0170749 A1* 7/2013 Tian .............................. 382/171

OTHER PUBLICATIONS

Kovesi, "Image Features from Phase Congruency", Videre: Journal of Computer Vision Research, vol. 1, No. 3, pp. 1-26, Summer 1999.
Jung et al., "Text Information Extraction in Images and Video: A Survey", 2004.
Tian, "Autofocus using image phase congruency", Optics Express, vol. 19, No. 1, pp. 261-270, 2011.
Nafchi et al., "A Phase Congruency Based Document Binarization", ICISP 2012, LNCS 7340, pp. 113-121, 2012.

* cited by examiner

*Primary Examiner* — Bhavesh Mehta
*Assistant Examiner* — Feng Niu
(74) *Attorney, Agent, or Firm* — Chen Yoshimura LLP

(57) ABSTRACT

A method is described for binarizing a gray scale document image, in particular, a document image containing both text and non-text contents. Phase congruency maps are calculated from the gray scale image, and used to segment the text and non-text areas of the gray scale image. The phase congruency maps are also used to extract long lines such as table lines, which can be optionally removed from the image. The text and non-text areas of the gray scale image are divided into image patches; for the text areas, connected components obtained from the phase congruency map are used to generate image patches, so that each image patch contains a text character. The image patches are binarized individually using individual threshold values, and then combined to generate a binary image of the gray scale image. The method can also be used for purposes of OCR or document authentication.

26 Claims, 4 Drawing Sheets

DOCUMENT IMAGE BINARIZATION AND SEGMENTATION USING IMAGE PHASE CONGRUENCY

BACKGROUND OF THE INVENTION

1. Field of the Invention

This invention relates to a method for binarizing a gray scale document image, and in particular, it relates to method for binarizing and segmenting a document image using image phase congruency.

2. Description of Related Art

In document processing, there is often a need to generate a binary image from a color or gray scale document image. Sometimes binarization is a part of a process to extract text from the image (referred to as optical character recognition or OCR). For example, a scanner typically scans a hard copy document into a grayscale or color image first, and then performs binarization to generate a binary (pure black and white) image and/or perform OCR to extract textual content from the scanned image. Or, with the widespread use of digital cameras and smart phones, a user can take a picture of a document or an object bearing text or labels, and a process is needed to convert the color or gray scale picture into a binary image and/or to extract the textural content. Often, the document image (the scanned image or picture taken with a camera) includes both text and non-text contents such as images or graphics. A binarization process often needs to distinguish text and non-text contents, and segment the overall document image to separate text and non-text contents.

SUMMARY

The present invention is directed to a method and related apparatus for binarizing and segmenting a document image (color or gray scale) using image phase congruency.

An object of the present invention is to provide an accurate and reliable method for binarizing and segmenting document images that contains both text and non-text contents.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for processing a gray scale document image, the document image including text areas, wherein the method includes: (a) calculating phase congruency maps from the gray scale document image, including calculating a plurality of phase congruency maps at different orientations and calculating a combined phase congruency map by combining the plurality of phase congruency maps at different orientations; and (b) segmenting the gray scale document image into text areas and non-text areas using the phase congruency maps, comprising: (b1) performing a texture analysis using the phase congruency maps at different orientations and the combined phase congruency map; (b2) extracting edges from the combined phase congruency map to generate a binary edge map; (b3) extracting connected components from the binary edge map and generating a list of connected components; (b4) obtaining statistical characteristics of the connected components; and (b5) based on a result of the texture analysis of step (b1) and the statistical characteristics of the connected components obtained in step (b4), segmenting the gray scale document image into text areas which have higher probabilities of containing text and non-text areas which have lower probability of containing text.

The method may further include: (c) dividing the text areas of the gray scale document image into a first plurality of image patches using the list of connected components generated in step (b3); and (d) binarizing each of the first plurality of image patches using a threshold value specific to that image patch to generate a first plurality of binarized image patches.

In another aspect, the present invention provides a method for binarizing at least text areas of a gray scale document image, where the method includes: (a) calculating a combined phase congruency maps from the gray scale document image, including: (a1) calculating a plurality of phase congruency maps at different orientations; and (a2) combining the plurality of phase congruency maps to generate a combined congruency map; (b) segmenting the gray scale document image into text areas and non-text areas using the combined phase congruency map, comprising: (b1) extracting edges from the combined phase congruency map to generate a binary edge map; (b2) extracting connected components from the binary edge map and generating a list of connected components; (b3) based on a statistical characteristics of the connected components, segmenting the gray scale document image into text areas which have higher probabilities of containing text and non-text areas which have lower probabilities of containing text; (c) dividing the text areas of the gray scale document image into a plurality of image patches using the list of connected components generated in step (b2); and (d) binarizing each of the plurality of image patches using a threshold value specific to that image patch to generate a plurality of binarized image patches.

In another aspect, the present invention provides a method for extracting a table in a gray scale document image, which includes: (a) calculating a first phase congruency map of the gray scale image in a horizontal orientation and a second phase congruency map of the gray scale image in a vertical orientation; (b) binarizing the first and second phase congruency maps to generate a first and a second binarized map, respectively; (c) identifying a plurality of horizontal lines in the first binarized map and a plurality of vertical lines in the second binarized map; and (d) extracting a table of the gray scale document image based on the plurality of horizontal lines and plurality of vertical lines.

In other aspects, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

It is to be understood that both the foregoing general description and the following detailed description are exemplary and explanatory and are intended to provide further explanation of the invention as claimed.

BRIEF DESCRIPTION OF THE DRAWINGS

FIGS. 2(a) to 2(d) are examples of various images and maps, in which:

FIG. 2(a) shows an original gray scale document image;

FIG. 2(b) shows a final phase congruency map of the document image with four scales and two orientations combined;

FIG. 2(c) shows an edge map obtained by applying a hysteresis technique with two thresholds to the final phase congruency map; and FIG. 2(d) shows a text segmentation map for the document image.

DETAILED DESCRIPTION OF PREFERRED EMBODIMENTS

Embodiments of the present invention provide a method for binarizing a gray scale document image, in particular, a document image that contains both text and non-text (e.g., image, graphics) contents. The method calculates phase congruency maps for the gray scale image, and utilizes the phase congruency maps to help segmenting the text and non-text areas of the gray scale image. The phase congruency maps are also used to extract long lines such as table lines in text areas and lone lines in non-text areas, which can be optionally removed from the image. After text segmentation, the text and non-text areas of the gray scale image are divided into image patches; for the text areas, connected components obtained from the phase congruency map are used to generate image patches, so that each image patch contains a text character. The image patches of the gray scale image are analyzed individually to obtain a binarization threshold for the image patch, which is then used to binarize the image patch. The binarized image patches are combined to generate a binary image of the gray scale image.

The method can also be used to extract the text content (commonly referred to as OCR, optical character recognition), or to authenticate the content of the document. Both processes make use of the binarized text areas accomplished by the above process.

Figure 1A:
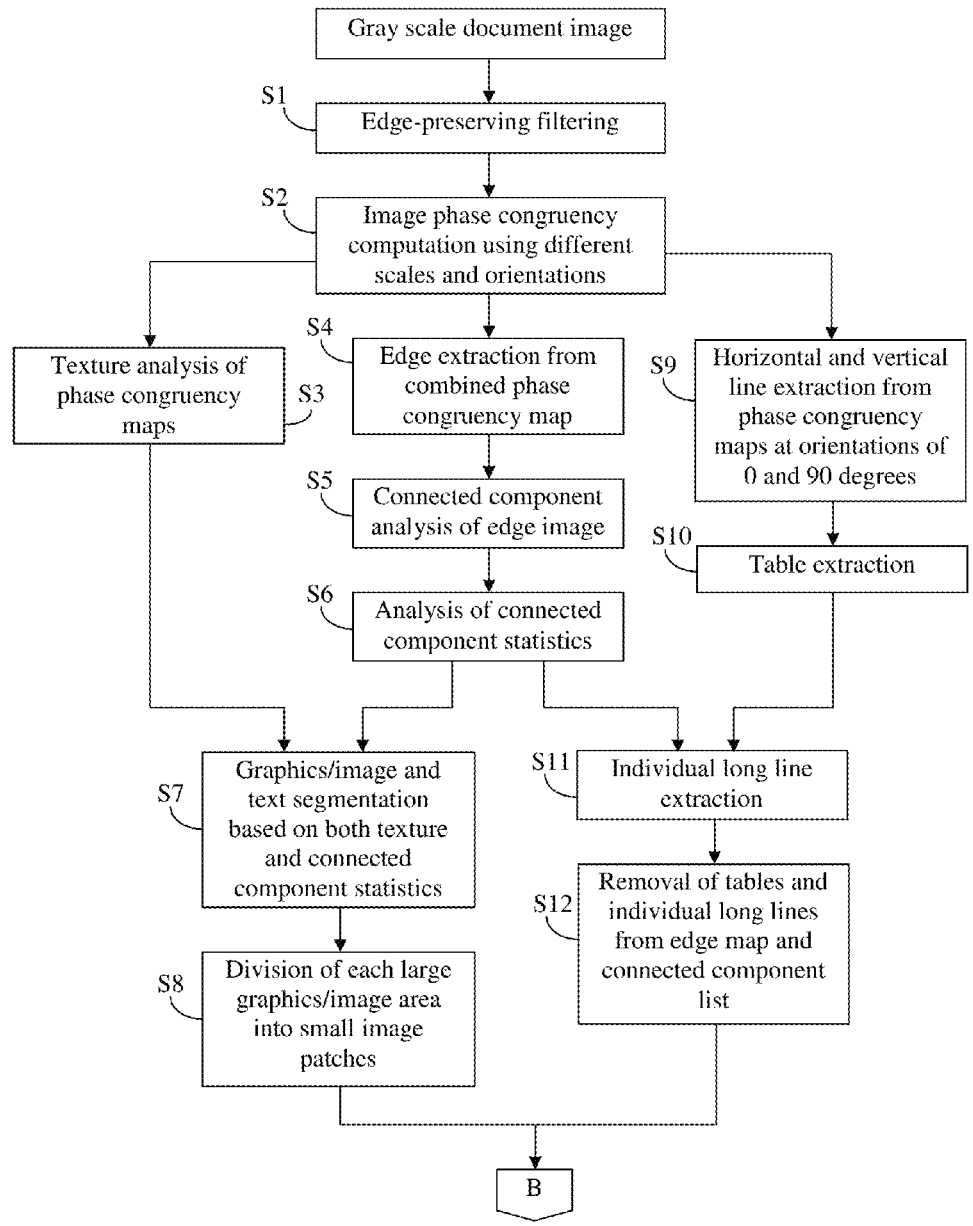
FIGS. 1(a) and 1(b) are a flow chart illustrating a document binarization method according to an embodiment of the present invention.
Figure 1B:
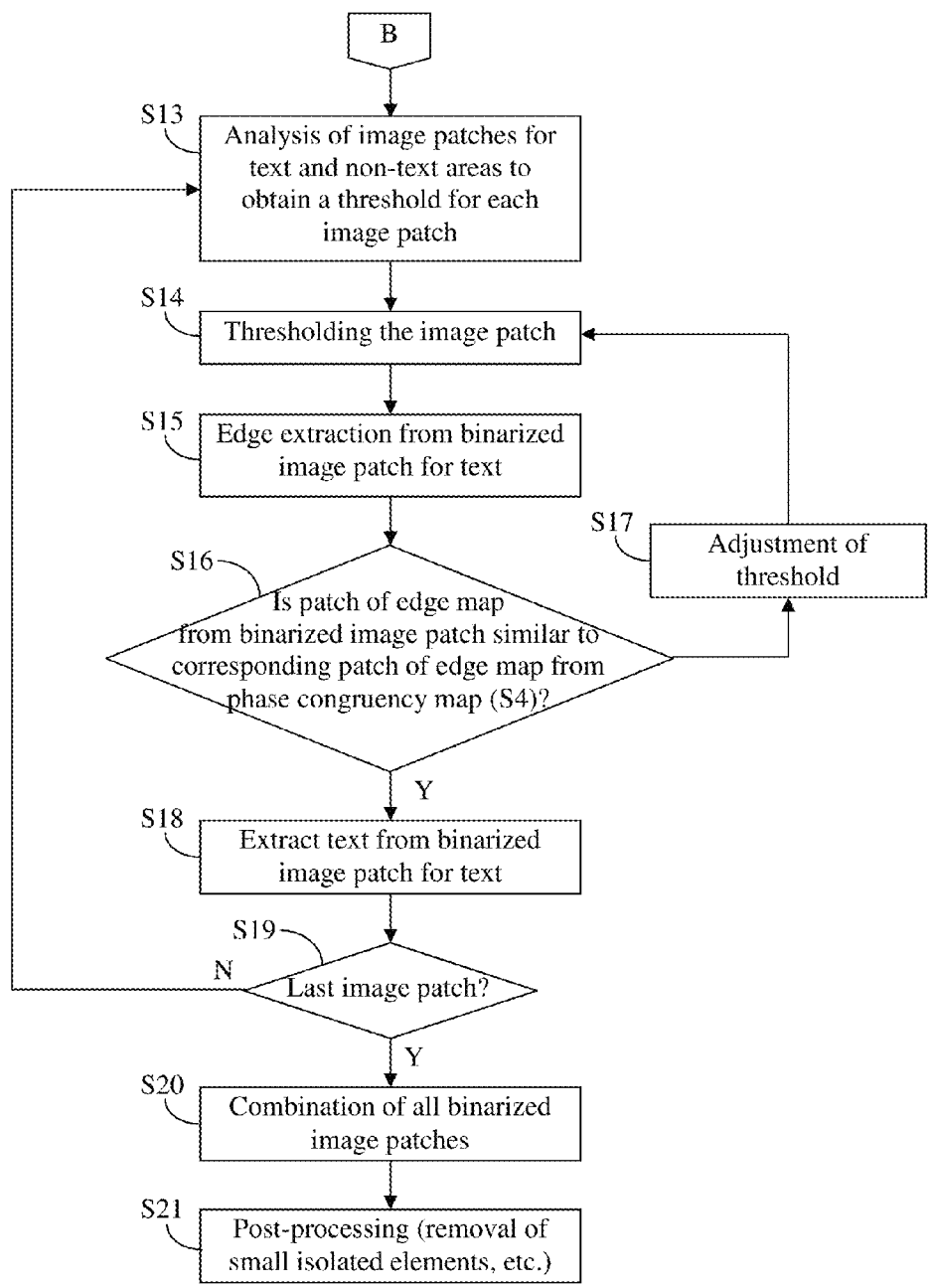

FIGS. 1(a) and 1(b) are a flow chart illustrating a document binarization method according to an embodiment of the present invention.

As shown in FIG. 1(a), the starting material of the process is a gray scale document image. If the original document image is a color image, it may be converted to a grayscale image using one of the known techniques. For example, the following color to grayscale conversion can be used:

$$I = 0.3 V_R + 0.59 V_G + 0.11 V_B$$

where $V_R$, $V_G$ and $V_B$ are the values of the R, G and B channels respectively and I the grayscale value. Alternatively, the binarization process described below may be carried out for each individual color component (e.g., R, G, B).

First, edge-preserving filtering is applied to the gray scale document image to remove noises while preserving edge features in the image (step S1). Various edge-preserving filters are known and can be used in this step, such as anisotropic diffusion, bilateral filtering, etc. Other suitable edge-preserving filters may be used.

Next, phase congruency computation is carried out for the image using different scales and different orientations (step S2). In computer image processing, phase congruency is a measure that describes the phase relationship among frequency components of an image. Kovesi, P., Image Features from Phase Congruency, Videre: Journal of Computer Vision Research, Volume 1, Number 3, p 1-26 (Summer 1999) (hereinafter "Kovesi 1999") describes using phase congruency to extract edge-like image features. Kovesi 1999 states in its Abstract: "Image features such as step edges, lines, and Mach bands all give rise to points where the Fourier components of the image are maximally in phase. The use of phase congruency for marking features has significant advantages over gradient-based methods. Phase congruency is a dimensionless quantity that is invariant to changes in image brightness or contrast; hence, it provides an absolute measure of the significance of feature points, thus allowing the use of universal threshold values that can be applied over wide classes of images." The calculation of phase congruency described in Kovesi 1999 is summarized in a simplified manner below; more details may be obtained from the reference itself, which is deemed to be within the ordinary skill in the relevant art. It should be understood, however, that other suitable ways of calculating phase congruency may also be used.

If S(x) denotes a 1D (one-dimensional) signal and $M^e_n$ and $M^o_n$ denote the even-symmetric (cosine) and odd-symmetric (sine) wavelets of the signal S(x) at scale n, one can think of the responses of each pair of filters as forming a response vector, $$[e_n(x), o_n(x)] = [F^e_n\{S(x)\}, F^o_n\{S(x)\}]$$

where $F^e_n$ and $F^o_n$ are the even-symmetric and odd-symmetric wavelet transforms at scale n.

The amplitude at scale n is:

$$A_n(x) = \sqrt{[e_n(x)]^2 + [o_n(x)]^2}$$

The phase angle at scale n is:

$$\varnothing_n(x) = a\tan(e_n(x), o_n(x))$$

The phase deviation at scale n is:

$$\Delta\varnothing_n(x) = \cos[\varnothing_n(x) - \overline{\varnothing(x)}] - |\sin[\varnothing_n(x) - \overline{\varnothing(x)}]|$$

where $\overline{\varnothing(x)}$ is the average phase angle of all scales.

Phase congruency is computed as:

$$PC(x) = \frac{\sum_n q(x) f_p[A_n(x)\Delta\phi_n(x) - T]}{\sum_n A_n(x)} \quad \text{(Eq. 1)}$$

where $f_p[u] = u$ if $u > 0$, $f_p[u] = 0$ if $u \leq 0$; T is a noise threshold, and q(x) a weight function. Details for how to compute T and q(x) are described in Kovesi 1999.

To extend the above definition to 2D (two-dimensional), the above-defined phase congruency values can be computed at each of multiple orientations (angles) of the 2D image and the results summed up as $$PC(x, y) = \frac{\sum_{or}\sum_n q_{or}(x, y) f_p[A_{or,n}(x, y)\Delta\phi_{or,n}(x, y) - T]}{\sum_n A_{or,n}(x, y)} \quad \text{(Eq. 2)}$$

where $q_{or}(x,y)$, $A_{or,n}(x,y)$ and $\Delta\phi_{or,n}(x,y)$ are similar to the corresponding variables in Eq. 1 but are calculated at orientation or. The summation is over various scales n and various orientations or.

Phase congruency at a particular orientation is obtained from Eq. 2 but without summing over the orientations or. The phase congruency defined by Eq. 2, i.e., after summing over n and or, may be referred to as the combined phase congruency or the final phase congruency.

In step S2, the phase congruency map is computed for the image by summing over different scales and different orientations using Eq. 2. The number of scales and orientations can be chosen based on practical considerations. Using too few scales and orientations will not give high quality phase congruency maps. Using too many scales and orientations will increase the computation intensity and reduce speed. Also, using too many orientations may make the map too sensitive to minor variations in the image. In some implementations of step S2, the summation in Eq. 2 may include 4 to 6 scales and 6 to 8 orientations (i.e. every 30 degrees, every 22.5 degrees, etc.—note that 180 degrees and 0 degrees are the same for purposes of Eq. 2).

Figure 2A:
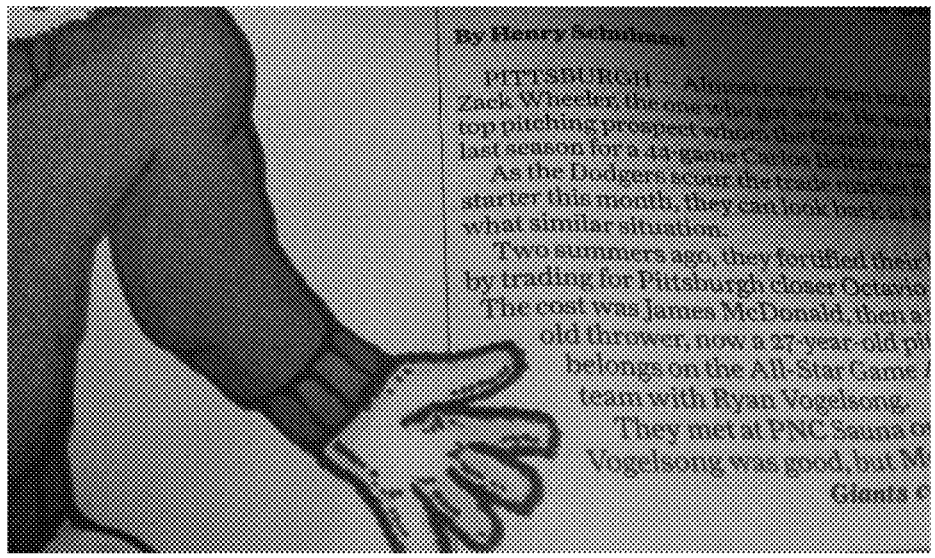
Figure 2B:
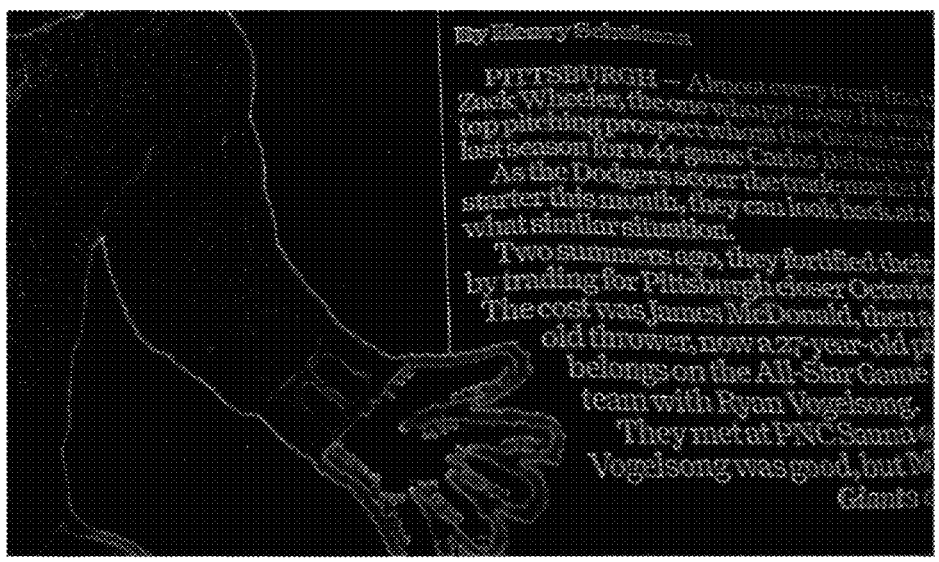

FIG. 2(b) illustrates a final phase congruency map for a sample gray scale image shown in FIG. 2(a). The final map was calculated after calculating and combining maps four different scales (3, 6, 12 and 24) and four different orientations (0, 45, 90 and 135 degrees).

It can be seen that the final phase congruency map calculated using the above method typically contains lines that correspond to the significant edge and line features in the original gray scale document image. For example, a step edge and a thin line in the image will typically be reflected as a line in the phase congruency map, and a thicker line will typically be reflected as a double line in the phase congruency map.

The phase congruency maps calculated in step S2, including the various intermediate maps such as maps at different scales and/or orientations, are used in several ways to analyze the document image, including texture analysis, edge extraction, and horizontal and vertical line extraction, as described in more detail below.

In step S3, texture analysis is carried out using the phase congruency maps. Multiple phase congruency maps at different orientations and scales, as well as the final phase congruency map with all scales and orientations combined, are used in this step. In image processing, "texture" generally relates to repeated characteristic patterns, such as horizontal or vertical lines, lines at certain angles, certain simple shapes such as triangles, etc. Generally, text areas and image or graphics areas of a document have different texture; thus, texture analysis can be used to distinguish text and image/graphics areas. Jung, K., Kim, K., and Jain, A., Text Information Extraction in Images and Video: A Survey (2004), Section 2.2.2, describes texture-based methods for segmenting text areas and image areas in document images. The methods described in this reference can be applied to the phase congruency map generated in step S2 to segment the text areas and non-text areas of the phase congruency map. The texture analysis described in this reference are applied to gray scale images; when applying such analysis in step S3, the phase congruency map is treated as a gray scale image.

In step S4, edge extraction is performed on the final phase congruency map generated in step S2. This step involves binarizing the phase congruency map, and the result is an edge map, which is a binary image containing edge pixels corresponding to edges in the phase congruency map.

In a preferred embodiment, a hysteresis method is used as a thresholding technique, by applying a high and a low threshold to the phase congruency map. The high threshold is applied to the phase congruency map in a first thresholding step, and a first edge map is generated. Using the first edge map, it may be assumed that pixels along the directions of the edge lines in the first edge map are also likely to be edge pixels even if their pixel values are below the high threshold value. Thus, in a second step, the low threshold is applied to these pixels (pixels along the direction of all edges in the first edge map); if a pixel is connected to an existing edge and its value exceeds the low threshold, it is considered an edge pixel and added to the edge map. In a simplified implementation, in the second step, the edge directions of existing edges are not calculated; rather, all pixels connected to an existing edge are checked, and if a pixel is connected to an existing edge and its value exceeds the low threshold value, it is considered an edge pixel.

Figure 2C:
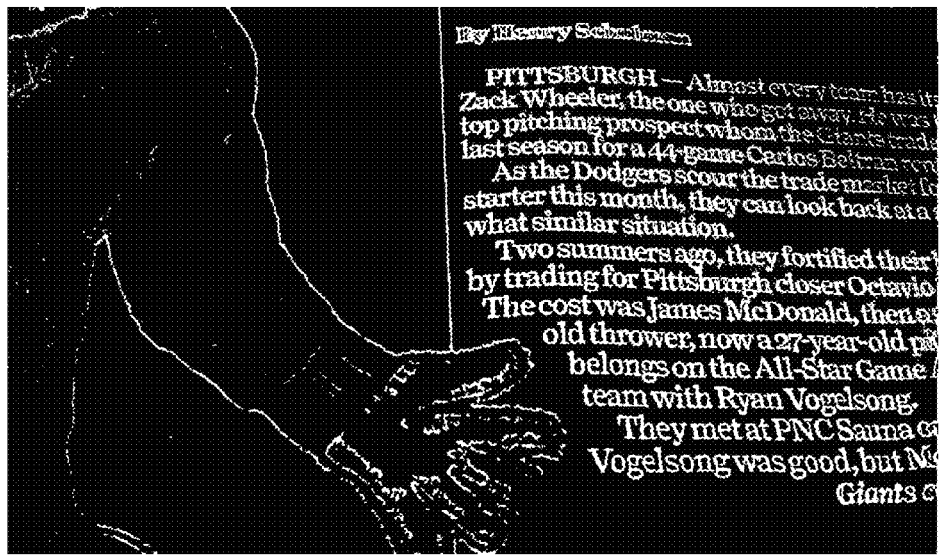

FIG. 2(c) is an edge map obtained by applying a hysteresis technique to the same phase congruency map, using the simplified implementation described above with two threshold values (T1=0.1, T2=0.05).

For text, edge maps often results in double-lined characters. Optionally, the double lines may be merged into single lines by applying morphological operations, resulting in single-lined characters as seen in FIG. 2(c) (it can also be seen that some originally thicker characters remain double-lined).

Then, a connected component analysis is applied to the binary image obtained in step S4 to extract connected components in the binary image (step S5). A connected component in a binary image is a group of pixels of the same value (white in this example) that are connected to each other. For example, in a binary image that contains text (such as in the right-hand portion of the map of FIG. 2(c)), each character of the text will likely forms one or two connected components. In the map of FIG. 2(c), each continuous line in the image on the left hand side will also form a connected component. A list of connected components is generated by step S5.

Then, characteristics of the connected components extracted in step S5 are analyzed to obtained statistical information of the connected components (step S6). For example, each connected component may be measured by its height and width, and the distributions of height and width of all connected components may be analyzed. Typically, for text, the connected components are mostly text characters which tend to have similar heights and widths and hence rather narrow height and width distributions as compared to connected components for images or graphics. Connected components for non-text (image, graphics) features also tend to be much larger than those for text characters.

Thus, in step S7, the statistics of connected component obtained in step S6 is used to segment the gray scale document image into text and image areas. The image segmentation step S7 also utilizes the results of texture analysis in step S3. As mentioned earlier, texture analysis can be used to distinguish text and image/graphics areas.

Figure 2D:
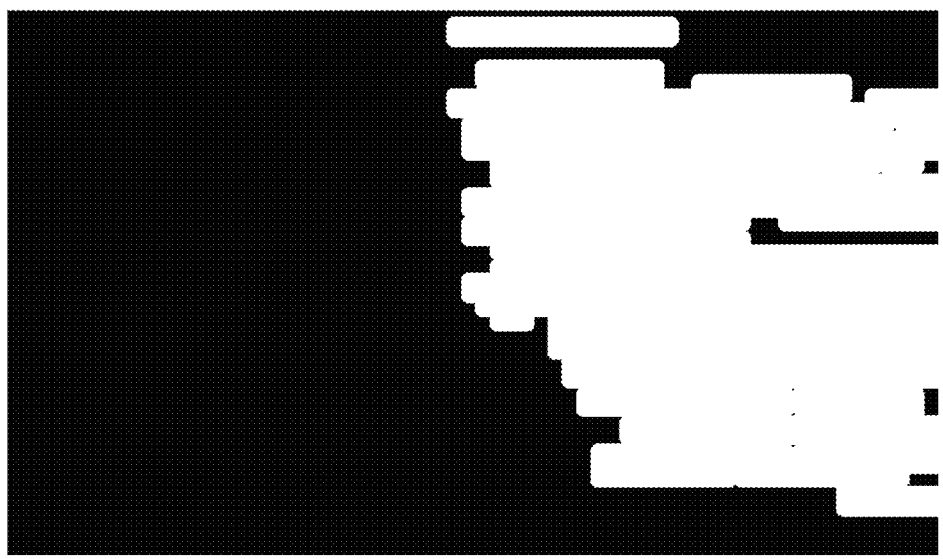

More specifically, based on the results of the texture analysis (step S3) and connected component statistical analysis (step S6), a text probability map is calculated, where the pixels in the map (which may correspond to a small area of the gray scale document image) have values that represent the probability of that pixel (area) being a text area. There are various ways to compute the text probability map. For example, it can be calculated using local density of texture (the amount of texture in a local window divided by the window size) weighted by the distribution of connected component sizes (e.g., very large and very small connected components are assigned less weights than the more commonly-sized ones). The text probability map is then thresholded to generate a binary text segmentation map as the output of the segmentation step S7. The binary pixel values of the text segmentation map indicate whether each pixel (corresponding to a small area of the document image) is a text area or a non-text area. FIG. 2(d) shows a text segmentation map generated for the document image shown in FIG. 2(a).

After text segmentation, the non-text areas of the gray scale document image may be divided into small image patches (step S8). Each patch may be, for example, a rectangle of 64×64 pixels. The image patches are used later to binarize the gray scale document image. The text areas do not need to be divided into image patches by step S8 because the connected components in the text areas can serve to define the image patches for binarization (described in more detail later). If the purpose of the document processing is to extract text content (OCR) rather than to generate a binary image of the document, then the non-text areas can be ignored and step S8 will not be needed.

Referring back to step S2, after the phase congruency maps are calculated, horizontal and vertical lines are extracted from the two phase congruency maps at orientations of 0 and 90 degrees (step S9). Horizontal lines in the gray scale document image tend to be prominent in the 0 degree phase congruency map but not in the 90 degree phase congruency map, and the opposite is true for vertical lines. These characteristics can be used to extract horizontal and vertical lines. This step involves first converting the 0 and 90 degree phase congruency maps into binary maps by thresholding. Then, a number of alternative techniques may be applied to the binary maps to extract lines. In one example, connected components are extracted, and the length, width, and aspect ratio (length divided by width) of each connected component are examined. Connected components with very large or very small aspect ratios are identified as horizontal or vertical lines. In addition, connected components that are neighbors of a line at its two ends and that extend along the same orientation may be identified as a part of the same line. In another example, a line detector algorithm, such as Hough transform, is applied to the 0 and 90 degree binary maps directly to detect lines.

Horizontal and vertical lines are sometimes present in documents as a part of tables, highlight boxes, underlines for text, etc. Tables typically include multiple horizontal lines of similar lengths and multiple vertical lines of similar lengths, and the two sets of lines intersect with each other to form a grid. In addition, there is usually text between the lines. By identifying these characteristics, tables can be extracted based on the horizontal and vertical lines extracted in step S9 (step S10). More specifically, this step includes identifying the locations of the detected horizontal and vertical lines and determining whether the two sets of lines intersect with each other. Having been extracted, the tables can be treated later in a number of ways as desired, such as: extract the text by OCR and discard the table format; reproduce the table in a reproduced text document; etc.

Then, the connected component list from step S5 and the connected component statistical information from step S6, as well as the phase congruency maps at orientations 0 and 90 degrees, are used to extract individual long lines from the document image (step S11). In this step, the individual long lines are not limited to horizontal and vertical lines and are not limited to straight lines. A line may be deemed a long line based on the statistical information of the connected components. As described earlier, connected components for text typically have heights and widths distributed within a narrow range around some characteristics height and width values. Thus, if a line in the connected component list has a height and/or width much larger than the characteristic values for text and lie outside of the distribution ranges for text, it is deemed a long line. The phase congruency maps at orientations 0 and 90 degrees are useful to extract individual long lines because they emphasize horizontal and vertical lines. Further, they can be combined into a map in which slanted lines are emphasized. A simple method of combining the two orientations is $$C=\sqrt{PC0^2+PC90^2}$$

where PC0 and PC90 denote the 0 and 90-degree congruency maps, respectively. Individual long lines can be extracted from these maps.

In steps S9, S10 and S11, to "extract" means to identify and separate the relevant features in the maps. After the tables and individual long lines are extracted, they can be removed from the edge map (generated in step S4) and the connected component list (generated in step S5) if desired (step S12). Step S12 is optional, depending on the overall purpose of the document image processing. For example, if the purpose of the document image processing is only to extract textual content (OCR), then the table lines can be removed and discarded, and the text within the tables can be OCR'ed and placed in a resulting text document (and a note can be inserted in the text document to indicate that certain text is originally contained in a table). Underlines for text can also be removed for OCR purposes as they may complicate character recognition. Similarly, if the purpose of the document image processing is to authenticate the content of the document (e.g. to determine whether the document content is the same as a reference document), then the table lines or other lines may not be important and can be removed using step S12. If, on the other hand, the purpose of the document image processing is to generate a binary image from a scanned gray scale or color image, then the table lines and other lines should be kept; i.e., the removal in step S12 will not be performed in this situation.

In step S13, image patches, i.e., small areas of the gray scale document image, are extracted and analyzed individually for the text and non-text areas. As mentioned earlier, for non-text areas (images and graphics), the areas are divided into image patches in step S8. If the purpose of the document image processing does not require processing of the non-text areas, these areas may be omitted in this step. For text areas, the connected components obtained in step S5 are used to extract image patches. For each connected component for text, the image patch may be defined by a convex hull or a rectangular bounding box that contains the connected component, plus a margin. As a result, each image patch contains a text character.

In step S13, each image patch of the gray scale document image is analyzed to determine a proper threshold value for binarizing that image patch. Then, each image patch is binarized using the threshold value determined in step S13 (step S14). In other words, each image patch is binarized using a threshold value specifically determined for the image patch. If the purpose of the document image processing is only to extract the text content, then steps S13 and S14 are not applied to non-text areas.

Next, steps S15-S17 are optionally performed for each image patch for text to verify the binarization result of step S14. In step S15, edge detection is performed on the binarized image patch of text to generate a patch of edge map. Similar to step S4, this may include applying morphological operations to merge double lines into single lines. In step S16, it is determined whether the patch of edge map from the binarized image patch (from step S15) is sufficiently similar to the corresponding patch of edge map generated from the phase congruency map (from step S4). Various metrics may be used to define the degree of similarity between the two patches of edge maps. One example uses Hausdorff distance between the two maps. The smaller the Hausdorff distance between two images, the higher their similarity. If the two edge maps are not sufficiently similar ("N" in step S16), the threshold for the image patch is adjusted and the image patch binarized again.

If the binarization is satisfactory ("Y" in step S16), the text (character) is extracted from the binarized image patch if it is an image patch for text (step S18). This step is optional, and may be performed if the purpose of the document image processing is OCR or text-based document authentication. The next image patch is processed ("N" in step S19) by repeating steps S13 to S18. After all image patches are processed ("Y" in step S19), all binarized image patches are combined to generate the binarized document image (step S20). Post-processing may be applied to the binarized document image, such as removal of small, isolated areas in the binary image (step S21). Steps S20 and S21 are optional, and are performed if the purpose of the document image processing is binarization or image-based document authentication.

The result of the document image processing process of FIGS. 1A and 1B is either a binary document image, or a text document containing the text content of the document, or both, depending on the purpose of the processing. If the purpose of the document image processing is authentication, an authentication step (not shown in FIG. 1(b)) may be carried out using the binarized document image or the extracted to determine if the document content is authentic. Any suitable authentication method may be used for this purpose.

The methods described above can be implemented in a data processing apparatus which includes one or more processors and a memory and/or storage device. The data processing apparatus may be a standalone general purpose computer, or it may be part of a printer, a scanner, a copier or a multi-function device (a device that can perform copying, printing and scanning functions). The data processing apparatus carries out the method by the processor(s) executing computer programs stored in the memory or storage device. In one aspect, the invention is embodied in a data processing apparatus. In another aspect, the invention is computer program product embodied in computer usable non-transitory medium having a computer readable program code embedded therein for controlling a data processing apparatus. In another aspect, the invention is a method carried out by a data processing apparatus.

Parallel processing employing multiple processors may be applied to carry out certain portion of the above method, such as calculation of the phase congruency map (step S2).

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

What is claimed is:

1. A method for processing a gray scale document image, the document image including text areas, the method comprising:
   (a) calculating phase congruency maps from the gray scale document image, including calculating a plurality of phase congruency maps at different orientations and calculating a combined phase congruency map by combining the plurality of phase congruency maps at different orientations; and
   (b) segmenting the gray scale document image into text areas and non-text areas using the phase congruency maps, comprising:
      (b1) performing a texture analysis using the phase congruency maps at different orientations and the combined phase congruency map;
      (b2) extracting edges from the combined phase congruency map to generate a binary edge map;
      (b3) extracting connected components from the binary edge map and generating a list of connected components;
      (b4) obtaining statistical characteristics of the connected components; and
      (b5) based on a result of the texture analysis of step (b1) and the statistical characteristics of the connected components obtained in step (b4), segmenting the gray scale document image into text areas which have higher probabilities of containing text and non-text areas which have lower probability of containing text.

2. The method of claim 1, further comprising, before step (a), applying edge-preserving filtering to the gray scale document image.

3. The method of claim 1, wherein step (b2) includes performing a hysteresis method using two threshold values to binarize the combined phase congruency map.

4. The method of claim 1, wherein the statistical characteristics of the connected components in step (b4) include a height and a width distribution of connected components.

5. The method of claim 1, wherein step (b5) includes calculating a text probability map representing a probability of each area of the gray scale document image being a text area, and thresholding the text probability map to generate a binary text segmentation map representing whether each area of the gray scale document image is a text area or a non-text area.

6. The method of claim 1, further comprising:
   (c) dividing the text areas of the gray scale document image into a first plurality of image patches using the list of connected components generated in step (b3); and
   (d) binarizing each of the first plurality of image patches using a threshold value specific to that image patch to generate a first plurality of binarized image patches.

7. The method of claim 6, further comprising:
   combining the first plurality of binarized image patches generated in step (d) into a binary image.

8. The method of claim 6, further comprising, after step (b):
   dividing the non-text areas of the gray scale document image into a second plurality of image patches;
   binarizing each of the second plurality of image patches using a threshold value specific to that image patch to generate a second plurality of binarized image patches; and
   combining the first and second plurality of binarized image patches into a binary image.

9. The method of claim 6, wherein the plurality of phase congruency maps at different orientations calculated in step (a) includes a phase congruency map at 0 degrees and a phase congruency map at 90 degrees,
   the method further comprising:
   (e1) extracting horizontal and vertical lines from the phase congruency maps at 0 and 90 degrees, respectfully;
   (e2) extracting tables based on the extracted horizontal and vertical lines;
   (e3) extracting long lines by analyzing the connected components extracted in step (b3) and the statistical characteristics of the connected components obtained in step (b4); and
   (e4) removing the horizontal and vertical lines extracted from step (e1) and the long lines extracted from step (e3) from the list of connected component generated in step (b3); and
   wherein the dividing step (c) is performed using the list of connected components after the removal step (e4).

10. The method of claim 6, further comprising, for each of the first plurality of image patches:
   (f1) after binarizing the image patch using the threshold value, extracting edges from the binarized image patch to generate a patch of edge map;
   (f2) comparing the patch of edge map generated in step (f1) with a corresponding patch of the edge map generated in step (b2); and
   (f3) based on a comparison result of step (f2), binarizing the image patch again using an adjusted threshold value.

11. The method of claim 6, further comprising: after step (d), extracting text characters from the first plurality of binarized image patches.

12. A method for binarizing at least text areas of a gray scale document image, the method comprising:
(a) calculating a combined phase congruency maps from the gray scale document image, including:
(a1) calculating a plurality of phase congruency maps at different orientations; and
(a2) combining the plurality of phase congruency maps to generate a combined congruency map;
(b) segmenting the gray scale document image into text areas and non-text areas using the combined phase congruency map, comprising:
(b1) extracting edges from the combined phase congruency map to generate a binary edge map;
(b2) extracting connected components from the binary edge map and generating a list of connected components;
(b3) based on a statistical characteristics of the connected components, segmenting the gray scale document image into text areas which have higher probabilities of containing text and non-text areas which have lower probabilities of containing text;
(c) dividing the text areas of the gray scale document image into a plurality of image patches using the list of connected components generated in step (b2); and
(d) binarizing each of the plurality of image patches using a threshold value specific to that image patch to generate a plurality of binarized image patches.

13. A method for extracting a table in a gray scale document image, comprising:
(a) calculating a first phase congruency map of the gray scale image in a horizontal orientation and a second phase congruency map of the gray scale image in a vertical orientation;
(b) binarizing the first and second phase congruency maps to generate a first and a second binarized map, respectively;
(c) identifying a plurality of horizontal lines in the first binarized map and a plurality of vertical lines in the second binarized map; and
(d) extracting a table of the gray scale document image based on the plurality of horizontal lines and plurality of vertical lines.

14. A computer program product comprising a computer usable non-transitory medium having a computer readable program code embedded therein for controlling a data processing apparatus, the computer readable program code configured to cause the data processing apparatus to execute a process for processing a gray scale document image, the document image including text areas, the process comprising:
(a) calculating phase congruency maps from the gray scale document image, including calculating a plurality of phase congruency maps at different orientations and calculating a combined phase congruency map by combining the plurality of phase congruency maps at different orientations; and
(b) segmenting the gray scale document image into text areas and non-text areas using the phase congruency maps, comprising:
(b1) performing a texture analysis using the phase congruency maps at different orientations and the combined phase congruency map;
(b2) extracting edges from the combined phase congruency map to generate a binary edge map;
(b3) extracting connected components from the binary edge map and generating a list of connected components;
(b4) obtaining statistical characteristics of the connected components; and
(b5) based on a result of the texture analysis of step (b1) and the statistical characteristics of the connected components obtained in step (b4), segmenting the gray scale document image into text areas which have higher probabilities of containing text and non-text areas which have lower probability of containing text.

15. The computer program product of claim 14, the process further comprising, before step (a), applying edge-preserving filtering to the gray scale document image.

16. The computer program product of claim 14, wherein step (b2) includes performing a hysteresis method using two threshold values to binarize the combined phase congruency map.

17. The computer program product of claim 14, wherein the statistical characteristics of the connected components in step (b4) include a height and a width distribution of connected components.

18. The computer program product of claim 14, wherein step (b5) includes calculating a text probability map representing a probability of each area of the gray scale document image being a text area, and thresholding the text probability map to generate a binary text segmentation map representing whether each area of the gray scale document image is a text area or a non-text area.

19. The computer program product of claim 14, the process further comprising:
(c) dividing the text areas of the gray scale document image into a first plurality of image patches using the list of connected components generated in step (b3); and
(d) binarizing each of the first plurality of image patches using a threshold value specific to that image patch to generate a first plurality of binarized image patches.

20. The computer program product of claim 19, the process further comprising:
combining the first plurality of binarized image patches generated in step (d) into a binary image.

21. The computer program product of claim 19, the process further comprising, after step (b):
dividing the non-text areas of the gray scale document image into a second plurality of image patches;
binarizing each of the second plurality of image patches using a threshold value specific to that image patch to generate a second plurality of binarized image patches; and
combining the first and second plurality of binarized image patches into a binary image.

22. The computer program product of claim 19, wherein the plurality of phase congruency maps at different orientations calculated in step (a) includes a phase congruency map at 0 degrees and a phase congruency map at 90 degrees, the method further comprising:
(e1) extracting horizontal and vertical lines from the phase congruency maps at 0 and 90 degrees, respectfully;
(e2) extracting tables based on the extracted horizontal and vertical lines;
(e3) extracting long lines by analyzing the connected components extracted in step (b3) and the statistical characteristics of the connected components obtained in step (b4); and (e4) removing the horizontal and vertical lines extracted from step (e1) and the long lines extracted from step (e3) from the list of connected component generated in step (b3); and wherein the dividing step (c) is performed using the list of connected components after the removal step (e4).

23. The computer program product of claim 19, the process further comprising, for each of the first plurality of image patches:
(f1) after binarizing the image patch using the threshold value, extracting edges from the binarized image patch to generate a patch of edge map;
(f2) comparing the patch of edge map generated in step (f1) with a corresponding patch of the edge map generated in step (b2); and
(f3) based on a comparison result of step (f2), binarizing the image patch again using an adjusted threshold value.

24. The computer program product of claim 19, the process further comprising: after step (d), extracting text characters from the first plurality of binarized image patches.

25. A computer program product comprising a computer usable non-transitory medium having a computer readable program code embedded therein for controlling a data processing apparatus, the computer readable program code configured to cause the data processing apparatus to execute a process for binarizing at least text areas of a gray scale document image, the process comprising:
(a) calculating a combined phase congruency maps from the gray scale document image, including:
(a1) calculating a plurality of phase congruency maps at different orientations; and
(a2) combining the plurality of phase congruency maps to generate a combined congruency map;
(b) segmenting the gray scale document image into text areas and non-text areas using the combined phase congruency map, comprising:
(b1) extracting edges from the combined phase congruency map to generate a binary edge map;
(b2) extracting connected components from the binary edge map and generating a list of connected components;
(b3) based on a statistical characteristics of the connected components, segmenting the gray scale document image into text areas which have higher probabilities of containing text and non-text areas which have lower probabilities of containing text;
(c) dividing the text areas of the gray scale document image into a plurality of image patches using the list of connected components generated in step (b2); and
(d) binarizing each of the plurality of image patches using a threshold value specific to that image patch to generate a plurality of binarized image patches.

26. A computer program product comprising a computer usable non-transitory medium having a computer readable program code embedded therein for controlling a data processing apparatus, the computer readable program code configured to cause the data processing apparatus to execute a process for extracting a table in a gray scale document image, the process comprising:
(a) calculating a first phase congruency map of the gray scale image in a horizontal orientation and a second phase congruency map of the gray scale image in a vertical orientation;
(b) binarizing the first and second phase congruency maps to generate a first and a second binarized maps, respectively;
(c) identifying a plurality of horizontal lines in the first binarized map and a plurality of vertical lines in the second binarized map; and
(d) extracting a table of the gray scale document image based on the plurality of horizontal lines and plurality of vertical lines.

* * * * *